Patented Oct. 3, 1922.

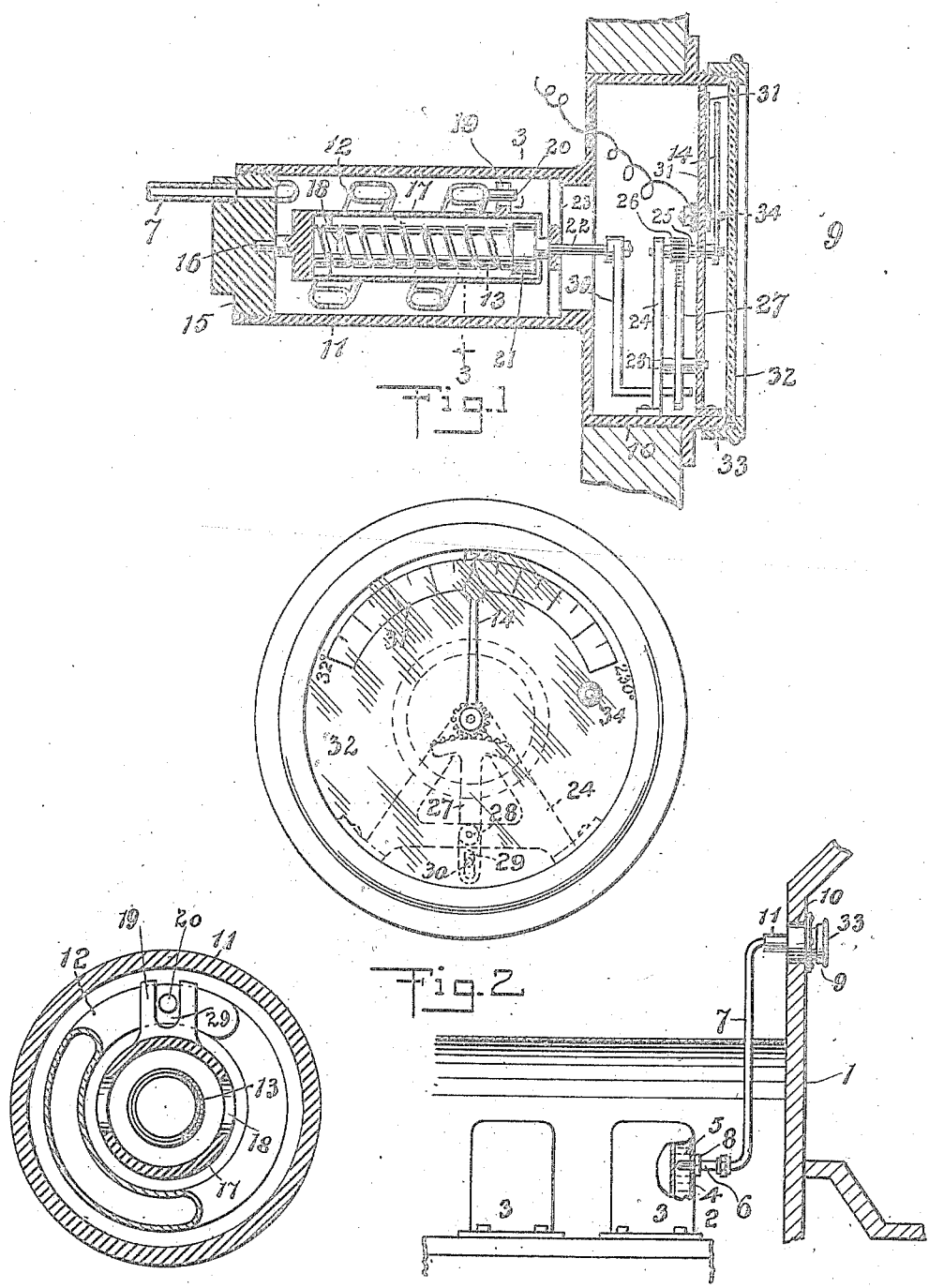

1,430,688

UNITED STATES PATENT OFFICE.

HERMAN SCHLAICH, OF BROOKLYN, NEW YORK.

TEMPERATURE-INDICATING SYSTEM FOR INTERNAL-COMBUSTION ENGINES.

Application filed March 6, 1916. Serial No. 82,518.

*To all whom it may concern:*

Be it known that I, HERMAN SCHLAICH, a citizen of the United States, and a resident of Brooklyn, in the county of Kings and State of New York, have invented certain new and useful Improvements in Temperature-Indicating Systems for Internal-Combustion Engines, of which the following is a specification.

My invention relates to a temperature indicating system adapted for use in connection with internal combustion engines; and it comprises a thermometer, or similar temperature indicating device designed especially to be mounted on the dashboard of conveyances propelled by such engines, and arranged so that the driver may keep himself informed of the condition of the medium by which such engines are cooled.

It is the primary object of my invention to provide a combination of elements which will show the temperature of the medium employed to cool an internal combustion engine, with absolute accuracy regardless of the influence of the atmosphere and other external factors; and I achieve this result by means of parts which are so controlled that the action thereof will always be reliable whether the surroundings of the engine be hot or cold; and therefore be capable of giving a true and exact indication of the real state of the cooling medium.

On the drawings which show an embodiment of the principle of my improvement:

Figure 1 illustrates a longitudinal section of a thermometer to be carried by the dashboard of an automobile or the like, in the practice of my invention;

Figure 2 is a front view of such a thermometer.

Figure 3 is a cross section taken on the line 3—3 of Figure 2; and

Figure 4 is a somewhat diagrammatic view showing my invention as applied to the engine by which the automobile or the like is driven.

The same numerals of reference are made use of in connection with the same parts throughout.

To describe my invention in detail, I employ the numeral 1 to indicate a suitable support, such as the dashboard of an automobile, for example; located in proximity to an internal combustion engine 2, having one or more power cylinders 3, provided with a jacket 4 to enclose a cooling chamber 5. To this chamber the water or other cooling agent will be supplied by suitable conduits, and conveyed therefrom to the usual radiator, not shown, at the front of the car, to be treated after absorbing part of the heat of combustion during passage through the chamber 5. The jacket 4 constituting the outer wall of this chamber will have a threaded opening therein to receive a tube 6, that is united to a temperature-indicating device, which will presently be discussed in full, on the dashboard 1, by a conduit 7. A lock nut 8 will secure the tube 6 in proper position on the jacket 4, and the tube and conduit will be connected by any type of union coupling now in common use. The temperature indicating device or thermometer is identified as a whole by the numeral 9, and various parts thereof are arranged to co-operate in a manner that will give the required effect above referred to.

The mechanism of the thermometer is housed in a suitable casing comprising a relatively large section 10, received in an aperture of the dashboard 1; and having a flange for the fastening screws; and a smaller section or projection 11 which extends in front of the dashboard 1 and contains a thermostatic element in the form of a hollow tube 12, shaped like a spiral; communicating at one end with the conduit 7, and connected at its opposite end to another thermostatic element in the form of a solid metallic spiral coil 13. The tube 12 is made like an ordinary gauge tube, bent as desired; and the coil 13 consists of a pair of superposed strips, one of brass and the other of nickel steel, with the latter on the inside. Both tubes 6 and 12, together with the connecting conduit 7, will be filled with a suitable expansible liquid, such as alcohol, glycerine, etc., and when the cooling medium gets heated the effect will of course be to cause the tube 12 to distend or unwind to a certain extent. The coil 13 will also respond to changes in temperature; but is so mounted that when heated, it will oppose the expansion or tendency to unwind of the coiled tube 12. In this fashion variations in the temperature of the surrounding air will be neutralized; and the action of the tube 12 regulated; so that a given variation in the temperature of the cooling medium will always produce a constant degree of movement of a pointer or index member 14, which is operated by the joint action of the tube 12 and coil 13. Consequently the tube 12 and the pointer 14 as well, will be truly responsive to the conditions of the cooling medium, and the influence of other factors eliminated.

For closing the outer end of the projection 11, I screw into it a plug 15 having a central opening on its inner face to serve as a bearing for a journal 16 of a sleeve 17. This sleeve encloses the coil 13 and is provided with openings or windows 18 in its opposite sides, through which the coil 13 can be plainly discerned. At its end near the journal or trunnion 16, the sleeve is of course closed; but its other end is open and on its outer surface adjacent the open end, the sleeve has a slotted projection 19 to receive a short arm 20 on the adjacent end of the spiral tube 12. The tube 12 and coil 13 thus have a lost motion connection which permits axial movement of the one relative to the other. I anchor the coil 13 to the end of the sleeve adjacent the journal 16, and the opposite end of the coil is fastened to a bushing 21, received in the open end of the sleeve and free to move therein; and from this bushing towards the section 10 extends a shaft 22. A bearing 23 in line with the bearing for the journal 16, in the section 11 adjacent the section 10, rotatably supports the shaft 22.

Inside the section 10 of the casing and projecting from the side thereof are arms 24 having alined bearings for a spindle 25, which carries the pointer 14. This spindle also carries a gear 26 between the arms 24, which is actuated by a curved rack on a lever 27; pivoted to the arms 24 between the shaft 25 and the side wall of the section 10, by means of a pin providing trunnions 28. Between this pin 28 and the surface of the section 10 the lever 27 has a slot 29 receiving the end of a crank 30 on the shaft 22. The forward arm 24 may carry the dial 31 with graduations marked thereon behind the pointer 14; and the front end of the casing will be closed by a glass face 32, held in position by a flanged ring 33 arranged to be screwed on the section 10. When the casing is mounted the arms 24 will be vertical.

The operation of my invention will now be explained. The various parts will be so fitted and connected that so long as the temperature of the water, or other cooling medium for the engine, does not exceed 170° F. the pointer 14 will take a position in the middle of the scale 31, as portrayed in Figure 2. If the cooling medium becomes hotter, the fluid in the tube 6, conduit 7 and tube 12 expands; and the pointer, as the tube 12 distends, will move over to the right. On the other hand, if the temperature of the cooling medium drops, the pointer will move to the left.

By the instrumentality of the thermostatic element or coil 13, the influence of atmospheric temperature and other disturbing factors is neutralized; and compensation is automatically made for variations in the action of the tube 12. It will be obvious that on a cold day a given rise in the temperature of the cooling medium would not produce the same movement of the pointer as on a warm day. This is because the temperature of the surrounding air materially effects the tube 12, as well as does that of the cooling medium, and the motion of the pointer is produced by both. The coil 13, however, is so designed that it will contract, or roll up, upon a rise in temperature, and its action is therefore the reverse of that of the tube 12. Therefore the higher the outside temperature and the greater the tendency of the tube 12 to expand, the greater will be the counter effect of the coil 13. Consequently the movement of the pointer 14 will always be uniform and a direct function of the condition of the cooling medium.

If desired I may locate an electric terminal 34 at the high temperature end of the scale 31, to be touched by the pointer 14 when the cooling medium becomes heated to say 230° F. To this terminal may be connected a wire leading to the main conductor joined to the proper terminal of the source of electric current for the ignition system. Hence when the pointer makes contact with the terminal 34 the source of current will be short-circuited and the operation of the igniters of the engine interrupted. As a result the engine cannot continue running, but must slow down and stop till the cooling medium is restored to proper condition; and damage averted even though the operator be too careless to heed the pointer 14.

The connections above detailed between the shaft 22 and the pointer 14 are especially useful when the projection 11 is eccentric with respect to the section 10. When the sections 10 and 11 are co-axial, as illustrated, the shaft 12 may be extended and the pointer 14 placed directly thereon, as the shafts 22 and 26 are shown in line with each other. By my invention the operator will always be enabled to give the engine proper attention and anticipate disorders. It can be employed not only on conveyances, but also on stationary engines, and might be utilized when such engines are cooled by some other medium, even by air, without change of principle or material alterations in structure.

It will be seen from the above that my improvement is simple and easily made, yet perfectly reliable in operation. While the construction disclosed herein is preferable, I reserve the right to make changes therein as respects the shape, size and arrangement of parts, within the scope and spirit of my invention as defined in the claims appended hereto.

Having described my invention, what I believe to be new, and desire to secure and protect by Letters Patent of the United States is:

1. The combination with an internal combustion vehicle propelling engine, of temperature indicating means for at all times indicating the operating temperature of the engine to the driver of the vehicle, and means controlled by said temperature indicating means for modifying the operation of the engine.

2. The combination with an internal combustion vehicle propelling engine having a cooling system, of temperature indicating means for indicating the temperature of the fluid within the system to the driver of the vehicle during the operation of the engine, and means controlled by said temperature indicating means for modifying the operation of the engine when the temperature of the fluid within the cooling system reaches a predetermined point.

3. The combination with an internal combustion vehicle propelling engine, of means associated therewith so as to be influenced by the temperature of the engine, indicating means controlled by said temperature-influenced means for showing normal and undesirable conditions of the engine and located to be read by the operator of the vehicle while driving the same, whereby said indicating means will serve normally as a guide for the operator in driving the engine at proper temperatures and abnormally as a warning to prevent or overcome undesirable conditions in the engine, and means controlled by said indicating means for modifying the operation of the engine.

4. The combination with an internal combustion vehicle propelling engine having a cooling system and an electrical ignition system, of an indicating system having a temperature responsive element associated with the cooling system in such manner as to respond to temperatures therein and having an indicating member adapted to indicate the thermal condition of the engine to the driver thereof, said instrument also having means for rendering the ignition system inoperative when the temperature of the cooling system reaches a predetermined point.

5. The combination with an internal combustion vehicle propelling engine having a water circulation cooling system of a bulb arranged in said system so as to be responsive to temperature changes therein, a gage mounted on the vehicle dash, a tube connecting said bulb and gage, indicating means in said gage, pressure-responsive devices in said gage for actuating said indicating means, and electrical contact devices in said gage actuated by said pressure-responsive devices, for rendering the electrical ignition means of the engine inoperative when a predetermined temperature is reached.

6. The combination with an internal combustion vehicle propelling engine having a water circulation cooling system and electrical ignition means, of a bulb located in the cooling system, a gage mounted in a position for observation by the driver of the vehicle, and connected to said bulb by a tube, pressure-responsive means in the gage, indicating means actuated by the pressure-responsive means, an electrical contact member in said gage connected to the ignition circuit, and a member in the gage moved by the pressure-responsive means thereof, adapted to make contact with said electrical contact device so as to short-circuit the engine ignition means when the temperature in the cooling system reaches a predetermined point.

7. The combination with an internal combustion vehicle propelling engine having a water circulation cooling system and electrical ignition means, of a bulb located in the cooling system, a gage therein mounted in a position for observation by the driver of the vehicle, and connected to said bulb by a tube, pressure-responsive means in the gage, indicating means actuated by the pressure-responsive means, an electrical contact member in said gage connected to the ignition circuit, and a member in the gage moved by the pressure-responsive means thereof, adapted to make contact with said electrical contact device so as to short-circuit the engine ignition means when the temperature in the cooling system reaches a predetermined point, said movable member being adapted to move out of contact with said electrical contact member upon a fall in temperature in the cooling system whereby said engine ignition system is automatically restored to an operative condition.

Signed at New York, in the county of New York, and State of New York, this 7th day of February, A. D. 1916.

HERMAN SCHLAICH.